United States Patent
Mylly et al.

(10) Patent No.: US 7,721,059 B2
(45) Date of Patent: May 18, 2010

(54) PERFORMANCE OPTIMIZATION IN SOLID-STATE MEDIA

(75) Inventors: Kimmo Mylly, Ylöjärvi (FI); Matti Floman, Kangasala (FI)

(73) Assignee: Nokia Corporation, Espoo (FI)

( * ) Notice: Subject to any disclaimer, the term of this patent is extended or adjusted under 35 U.S.C. 154(b) by 297 days.

(21) Appl. No.: 11/482,494

(22) Filed: Jul. 6, 2006

(65) Prior Publication Data

US 2008/0010395 A1    Jan. 10, 2008

(51) Int. Cl.
    *G06F 13/00* (2006.01)
(52) U.S. Cl. .................... 711/165; 711/103
(58) Field of Classification Search .............. None
    See application file for complete search history.

(56) References Cited

U.S. PATENT DOCUMENTS

| | | | | |
|---|---|---|---|---|
| 5,720,015 | A * | 2/1998 | Martin et al. | 358/1.15 |
| 6,038,636 | A * | 3/2000 | Brown et al. | 711/103 |
| 7,089,549 | B2 * | 8/2006 | Venkiteswaran | 717/170 |
| 7,167,964 | B1 * | 1/2007 | Scherzer | 711/165 |
| 7,401,174 | B2 * | 7/2008 | So et al. | 711/4 |
| 2003/0229752 | A1 * | 12/2003 | Venkiteswaran | 711/103 |
| 2005/0021904 | A1 * | 1/2005 | Iaculo et al. | 711/103 |
| 2005/0193025 | A1 * | 9/2005 | Mosek | 707/200 |
| 2005/0231765 | A1 * | 10/2005 | So et al. | 358/1.16 |
| 2006/0221719 | A1 * | 10/2006 | Maeda et al. | 365/189.05 |
| 2007/0006211 | A1 * | 1/2007 | Venkiteswaran | 717/168 |

FOREIGN PATENT DOCUMENTS

WO    WO 9956212 A1 * 11/1999

OTHER PUBLICATIONS

"TrueFFS® Wear-Leveling Mechanism", Dmitry Shmidt, Technical Note (TN-DOC-017), May 20, 2002, 3 pages.

* cited by examiner

*Primary Examiner*—Kevin Verbrugge
(74) *Attorney, Agent, or Firm*—Harrington & Smith

(57) ABSTRACT

A host device is coupled to a peripheral device such as a multi media card or the like, where the peripheral device includes a solid state data storage segment. The peripheral device has means for initiating a defragmentation function, such as registers for comparing a current performance measure against a threshold performance metric, or block validity parameters received form the host device for the data storage segment of the peripheral device. Once met, the means for initiating cause a defragmentation function to execute on the data storage segment. A logical layer of the data storage segment is accessed by the host device and a physical layer of the data storage segment is accessed by the peripheral device. The defragmentation program may be resident on either the host or peripheral device. Defragmentation may be enabled to execute automatically once initiated, such as by a continuous or periodic background scan of current performance of the data storage segment.

21 Claims, 3 Drawing Sheets

PERFORMANCE OPTIMIZATION IN SOLID-STATE MEDIA

TECHNICAL FIELD

The present invention relates to solid-state computer-readable storage media that operates in combination with a processor used to manage that media. Both removable (e.g., memory cards, like MultiMedia Card, SD, Compact Flash) and non removable (e.g., MMC on CSP package) media are encompassed by the present invention. It is particularly related to managing storage performance on such storage media.

BACKGROUND

Computer storage media are prone to becoming fragmented over time, which results in slower operations and higher power consumption when the processor must re-assemble fragmented logical file segments from disparate physical locations on a computer storage media. The problem exists on both disk-type and solid-state storage media, though is becoming more acute with increasing use of portable storage media that is removable from its host device. Such removable media includes, for example, SD cards, memory stick cards, SIM cards, and multimedia cards.

Traditional disk-type drives have one or more platters that rotate about a spindle. In the physical storage realm, concentric rings about the spindle are termed tracks, which are divided into physically addressable sectors that each represent a fixed amount of volume (e.g., 512 bytes) in which data may be stored. In the logical storage realm, a file is stored on the hard drive in the clusters, sometimes termed allocation units. These clusters span across several physical sectors, generally a fixed number per cluster for a particular hard drive and its implementing software. For example, in a 1 GB hard drive using a 16-bit file allocation table, there are 32 sectors and 16,384 kilobytes (rounded to 16 KB) in a single cluster. Larger hard drives have more sectors per cluster.

Each file on the computer has a record in the file allocation table (FAT), storing information about the type and status of files that have been saved to the hard drive. Each record contains a numerical reference to the beginning cluster of each file. Since many files are larger than a single cluster and must span multiple clusters, the FAT additionally holds the cluster numbers for the succeeding clusters that contain the remaining portions of the file. If there is no "next" cluster in a file chain, the FAT sets an end-of-file marker to show that the data for a given file stops and where it stops. The logical/physical table correlates the physical storage location (the sector of memory) of each logical portion of a file (the cluster of the file).

However, each cluster may only contain data from a single file, so any unused portion of a cluster remains unusable for other data, until the original file is moved or erased. For example, consider a cluster size of 16 KB and two files of sizes 30 KB and 18 KB. Each file occupies two clusters, but the first 30 KB file leaves 2 KB unused whereas the second 18 KB file leaves 14 KB unused. As more files are stored and existing files are modified and re-stored, the clusters over which a single file are stored tend to be further removed from one another physically. This is termed disk fragmentation. When clusters that make up a given file become scattered or fragmented, it takes the file allocation table longer to re-assemble the file from non-contiguous clusters, which slows down hard drive functions. Fragmentation occurs naturally over time as files are opened, closed, and modified, so computers are equipped with disk de-fragmentation software to re-arrange stored files over contiguous clusters. Over time, the FAT will reflect valid and invalid blocks and faulty segments, which slow read and write processes due to the additional movement that the read/write head must undergo to read logically sequential clusters that are not physically sequential. Typically, the FAT is located in the mass memory to which it applies, and modified by the host computer that runs it. The host reads the clusters from the mass memory FAT and directs the read/write head to the proper physical location for the logically sequential clusters. The host computer uses its own caching to re-store the clusters into more sequential physical sectors, and so after defragmentation the logical/physical table is updated to reflect the new locations of the file clusters.

Fragmentation also occurs naturally over time in solid-state storage media, such as multimedia cards, flash memory, and memory sticks to name a few. A removable media is characterized in that the media is intended to be physically separable from the computing device whose operating system reads from and writes to the removable media. Certain types of storage media are commonly characterized as being divided into pages (analogous to a sector, generally 512 or 1024 bytes), physical sectors (analogous to the sets of sectors that equal a cluster) and logical sectors (analogous to the cluster).

Each physical erase unit, the smallest memory area of a solid-state storage media that can be erased in a single operation, is subject to some type of erase cycle limit. This limit is a floor on the number of times that each erase unit may be written to and erased, within a certain statistical confidence level. Beyond that cycle limit, performance of that erase unit is not guaranteed. At least one company (M-Systems) has developed what it terms a 'wear leveling' algorithm to ensure that the various erase units are cycled relatively uniformly, rather than having the same erase units undergo high cycling while others are seldom used. For example, anytime any file is changed or a new file is stored on a removable media, the file allocation table is updated which uses one cycle for each erase unit occupied by that table. Unless the table is moved to different erase units, those units on which the file allocation table was repeatedly stored after each update would fail much sooner than other erase units of the same removable media. Unfortunately, wear leveling increases fragmentation, degrading performance (e.g., speed of the read/write operations) at the same time that it extends the usable life of the overall data storage media.

It is apparent that the above concerns make it difficult to define or guarantee a minimum performance for a solid-state media. Industry practice (MultiMediaCard Association) is to calculate a practical worst-case scenario for fragmentation (which includes hardware and software considerations). While this may be some measure of media performance, it is quite rough and substantially under-represents the actual performance that a user can reasonably expect given the physical capabilities of the solid-state media itself. What is needed in the art is a more efficient use of storage media that translates into a performance parameter that can be measured and readily determined.

SUMMARY

The foregoing and other problems are overcome, and other advantages are realized, in accordance with the presently preferred embodiments of these teachings.

In accordance with one embodiment, the invention is a method for managing a computer readable storage media of a peripheral device. A host device is coupled to a peripheral device, and the peripheral device includes a solid state data storage segment. Responsive to means in the peripheral device for initiating a defragmentation function, the defragmentation function is executed on the data storage segment by accessing a logical layer of the data storage segment with the host device, and by accessing a physical layer of the data storage segment with the peripheral device.

In accordance with another embodiment, the invention is a peripheral device that includes a solid state data storage segment for storing data files each of which is identified by a file name, a table for storing an association of physical addresses to logical addresses of the data files, and an interface for coupling the peripheral device to a host device. The interface further enables the host device to access the data storage segment and either or both of the logical addresses of the table or the file names of the data files. The peripheral device further includes means for initiating a defragmentation function on the data files that are stored in the data storage segment.

In accordance with another embodiment, the invention is a program of machine-readable instructions, tangibly embodied on an information bearing medium and executable by a digital data processor, to perform actions directed toward managing a solid state storage media. In this embodiment, the actions include determining that a peripheral device is coupled to a host device, and at the peripheral device, initiating a defragmentation function. Then, the defragmentation function is executed on a solid state data storage segment of the peripheral device, by accessing a logical layer of the solid state data storage segment with the host device and by accessing a physical layer of the solid state data storage segment with the peripheral device.

Further details of these and other aspects of the invention are given below.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE EMBODIMENTS

Figure 1:
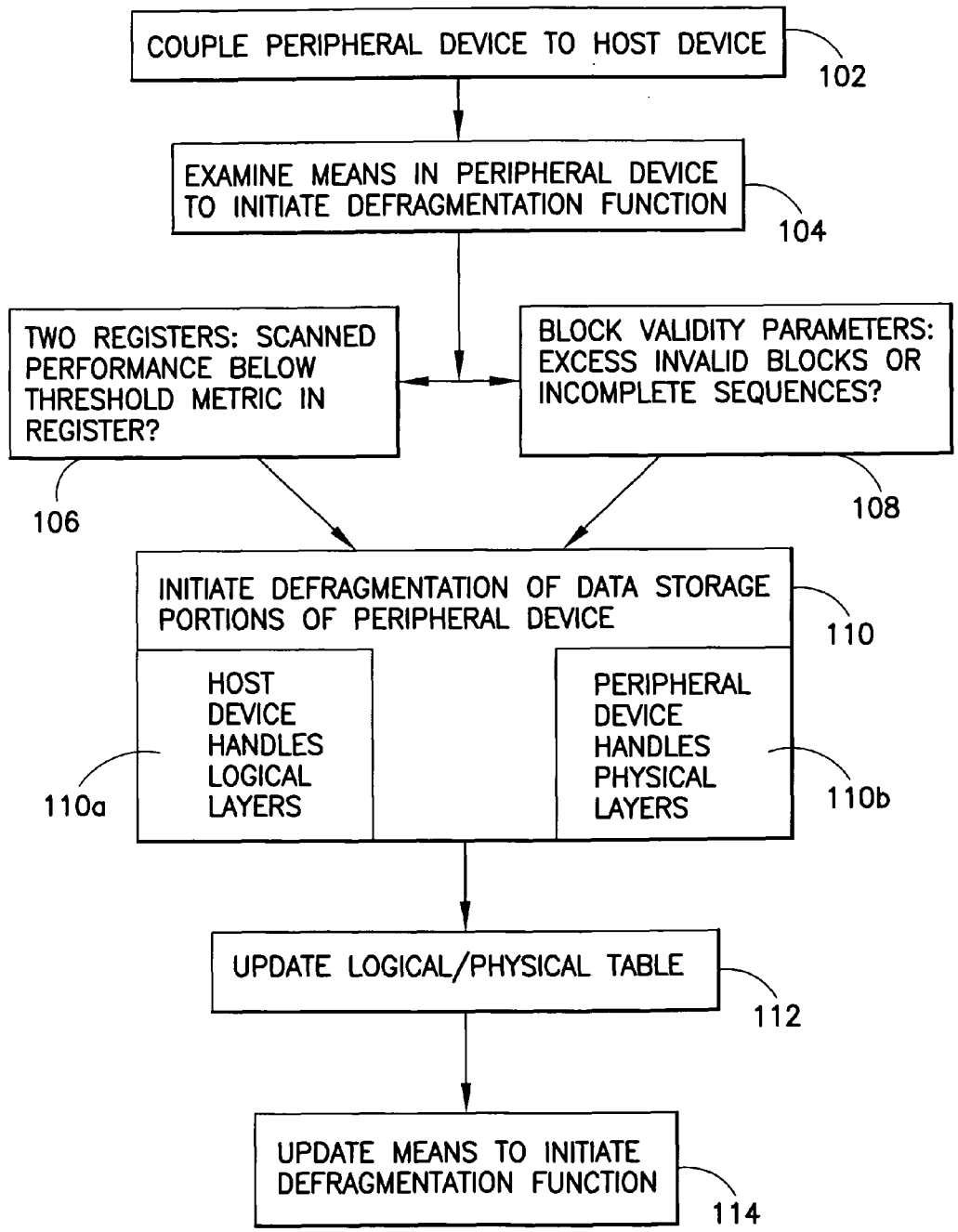
FIG. 1 is an arrangement of process steps according to an embodiment of the present invention.

In the prior art noted above, the guaranteed performance by wear leveling provides a much lower performance guarantee than the true physical capabilities of the storage media. Defragmentation functions in the prior art rely on the host computing device directly controlling the physical addresses of clusters in the storage media. According to the present invention, the storage media controls the file allocation system for itself so that the host computing device has access to the logical layers but the storage media retains control over the physical layer issues for defragmentation (or other performance enhancing programs or functions). The term "file allocation system" is used generically to represent a system of software allocation for stored files. Some know examples of file allocation systems include, but are not limited to: file allocation tables FAT; new technology file system NTFS (Microsoft); heirarchical file system HFS (Apple Computer), second extended file system ext2 (Linux); third (journalled) extended file system ext3 (Linux), a CD-ROM file system for use with CD-ROM ISO 9660, on-disk stgructure ODS-5 (Hewlett-Packard); and universal disk format UDF for optical media. In one embodiment of this invention, the host computer 'fine-tunes' the file allocation system in the storage media. In a first variation, the storage media will not know which blocks are valid or not valid, and needs the host to move files into continuous physical sequence (defragmentation). Because the storage media does not know which blocks are valid or invalid, it cannot initiate defragmentation on its own because it has no knowledge (apart from being informed by the host computing device) of its current overall fragmentation condition against which to compare against a threshold; initiating defragmentation will then rely on the host or a user input. In a second variation, the storage media can read its own storage and determine its own overall fragmentation condition and can initiate defragmentation when its current view of that current condition falls below some threshold. Defragmentation in this second variation need not rely on the host using caching as is common in the prior art defragmentation processes; caching may be performed entirely within the storage media itself.

In another embodiment, the host accesses a logical layer of the storage media for the defragmentation function, but the storage media itself handles the physical layer issues. This is related to the first embodiment, but broader. The interface between the host computing device and the storage media, at least for the defragmentation function, is at the file level rather than the block level. The file allocation system still resides in the storage media, and the storage media itself controls its own file allocation system as well as having the means to execute the defragmentation function. The host may have direct access to the physical layer via specific commands and registers (e.g., the file allocation system), and may command the storage media to execute a defragmentation function, but that function is executed within the storage media, which in this instance know which blocks are valid and invalid and can therefore in some instances execute the defragmentation function by comparing its own current fragmentation condition to some stored threshold. Relatedly, the host computing device might merely communicate to the storage media some higher level information (e.g., file name and the file data), and the storage media handles storage and fragmentation issues on its own (e.g., logical file system and physical layer issues, such as which blocks to store the file data).

These aspects and embodiments are detailed more particularly below. The term host computing device refers to a computing device that currently controls the storage media, and may be a processor (of the single or multi-processor varieties), a stand-alone personal computer (desktop/laptop), a portable computing device (e.g., personal digital assistant, mobile phone, mobile email device, music/video device, etc.). The storage media is advantageously removable so that it may come under the control of different host computing devices at different times, though it may be fixed to one host device. Preferably, the storage media is of the solid state variety (e.g., a flash drive) rather than the rotating disc variety.

FIG. 1 is a process diagram showing generalized steps according to an embodiment. A peripheral device, such as a multimedia card MMC, a flash memory stick, or other storage device (that is preferably but not necessarily normally removable from a host device) is coupled to a host device at block 102. The host device has a processor that controls the peripheral device. While in some embodiments the peripheral device may also include its own processor (e.g., a smart card), the host device is master over the peripheral device, at least for the functions described herein. The peripheral device has means for initiating a defragmentation function, which are examined at block 104 once the two devices are coupled. Defragmentation is a performance enhancing function that operates on a data storage segment of the peripheral device, and defragmentation may operate to re-arrange logical data file segments into physically contiguous or sequential addresses, into an efficient use of physical storage space (e.g., to maximize available unused storage space), or to optimize these parameters in combination with one another or another parameter such as wear leveling.

The means for initiating a defragmentation function is within the peripheral device. As an example, one means for initiating can be block validity parameters and data segments sequences stored in the peripheral device, at block 108. Block validity parameters are known in the art, but to the inventors' knowledge of the prior art are not stored in a peripheral device but must be generated by a host processor anytime they are needed. These parameters might be read from the peripheral device by the host and stored in a register of the peripheral device, or may be read by a processor of the peripheral device itself. When the block validity parameter(s) fall below some threshold, the defragmentation function will be initiated. As another example, the means for initiating can be a pair of registers at block 106, one storing a current performance metric such as fragmentation of an individual program or an average fragmentation of all programs as currently stored in the peripheral device memory, and the other register storing some threshold that when compared against the first-mentioned register will trigger the defragmentation program. The current register can be updated continuously in background, or periodically, or based on some discrete event such as writing a new file that exceeds a certain size to the peripheral device, erasing a file that exceeds a certain size from the peripheral device, or the like.

Once the means to initiate defragmentation at block 104 is examined and defragmentation is deemed appropriate at blocks 106 or 108, then block 110 initiates the defragmentation function on the data storage of the peripheral device. Actual execution of the defragmentation function may be by a command from the host device that reads the register(s) or file names and deems no conflicts with other programs that might be accessing the peripheral device data storage, or it may be automatically executed once initiated. During defragmentation, the host device handles the logical layers of the data storage in the peripheral device, and the peripheral device itself handles the physical layers. The host device might also have direct access to the physical layers, or a processor in the peripheral device may operate in conjunction with the host processor in executing the defragmentation function. Data files are moved to new storage locations of the peripheral device by writing them to a cache and then copying them to the new storage location. Data transfer between the host and peripheral device may use the physical addresses or the file names (e.g., from the file allocation system). In some embodiments, the cache 216 is wholly within the peripheral device; in other embodiments, the cache might be in the host device so that all re-written data is moved through an interface between the host and peripheral devices.

While running or once the defragmentation function (computer software program) is completed, at block 112 the logical/physical table associating logical file segments with their physical addresses in the peripheral device is updated to reflect the new addresses. At block 114, the means to initiate defragmentation is also updated. For example, if the performance registers of block 106 were used, the current performance metric is updated since it is changed due to the defragmentation function being executed; or if the block validity parameters were used as the means to initiate then those are updated since the formerly invalid blocks may or may not be valid after defragmentation (most if not all should be valid immediately after).

Figure 2:
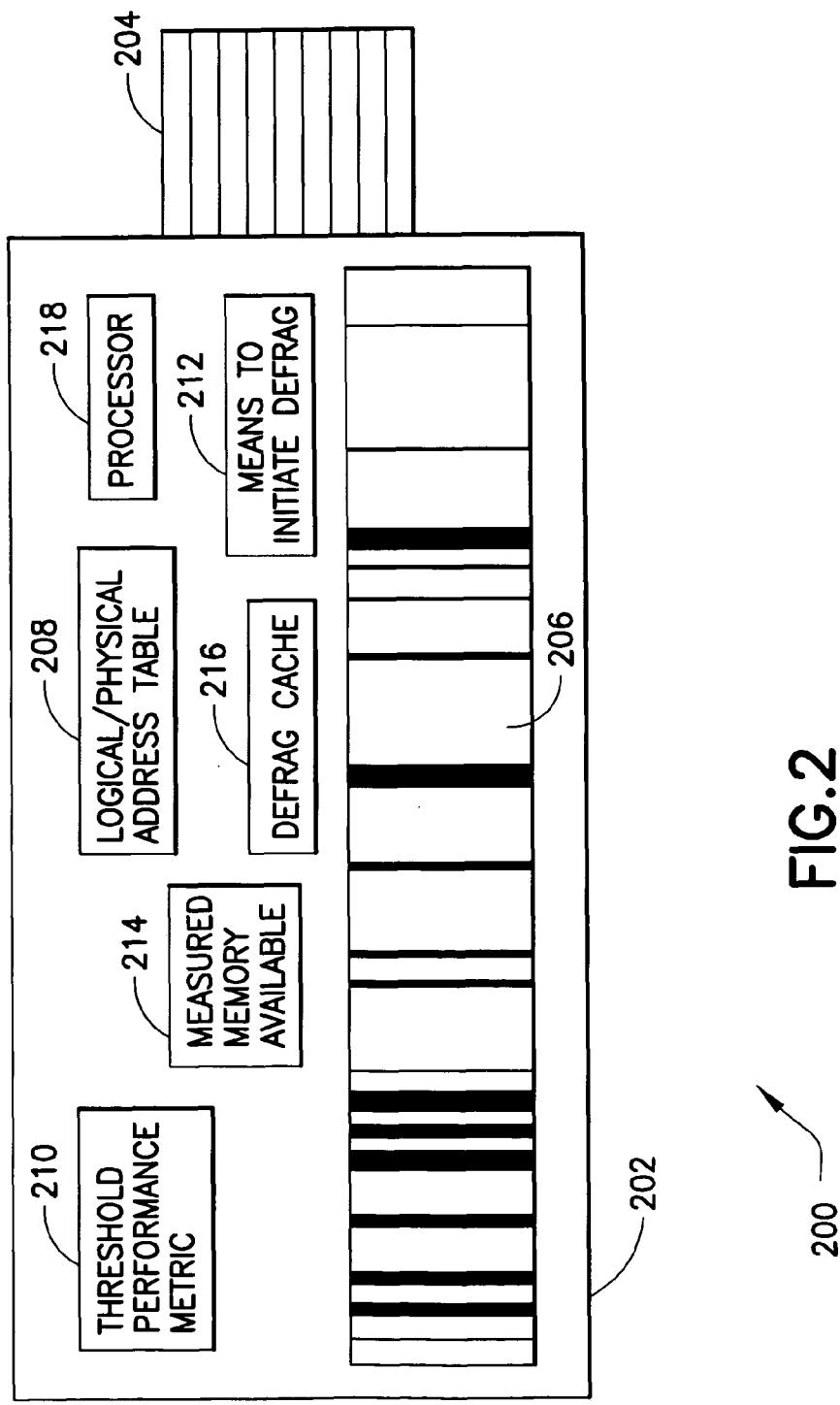
FIG. 2 is a block diagram of a solid-state storage media according to an embodiment of the present invention.

FIG. 2 is a block diagram of a peripheral device 200 according to an embodiment of the present invention. It is shown as a flash-type peripheral device/memory stick for clarity of illustration, though the same functional blocks may be present in any removable storage media such as a multimedia card. A body 202 stores user data and registers according to the present invention. A coupling means 204 or interface is for removably coupling to a host device (see FIG. 3), such as a personal desktop or laptop computer, a portable music player device, a mobile station, a personal organizer, and the like. Data and computer instructions flow through the coupling means 204 via an interface that may be, for example, electronic, magnetic, or optical. The coupling means 204 may be a magnetic strip, one or more metal pads with a spring connector along a face of a multimedia card, or other such interface adapted to exchange data and instructions between the removable media 200 and a host device.

It is noted that the storage components described below are logical storage components and not necessarily tied to particular physical locations within the peripheral device 200; the relation between the two is reflected in the logical/physical address table 208. When defragmentation is executed, certain segments may be overwritten and moved, and the allocation of the functional/logical segments described herein may move among different physical storage units as different operations occur within the peripheral device. The segments are physically separated from one another just as any other data files are separated at the end of all write processes and related register updates.

Disposed within the body 202 is a data storage segment 206 for storing data files that a user may read from and write to by use of an attached host device. The data storage segment 206 is shown as a block with vertical lines that represent clusters in varying degrees of fragmentation. Also within the body is a logical/physical address table 208 that stores a register of physical addresses mapped to the logical files for each separate cluster of the data storage segment 206. The logical/physical address table 208 is updated anytime a file is written to or erased from the data storage segment 206. Other events may also cause the logical/physical address table 208 to update.

A threshold performance metric register 210 stores a performance metric that relates to optimum performance of the data storage segment 206. In one embodiment, this optimum performance metric is a minimum performance figure if the data files if the data storage segment 206 were in optimal fragmentation. The minimum performance figure may be a relative term that varies with the amount of data files stored in the data storage segment, and possibly their sizes, so it too may be updated at block 114 of FIG. 1 after a defragmentation function is run. Sizes of data files matter when the minimum performance figure is dynamically determined, since not all combinations of data files whose aggregate storage volume is the same will de-fragment to the same physical size on the storage media 200.

A means to initiate 212 a performance enhancing computer program to execute on the removable storage media 200, such as arguments (e.g., block validity parameters, comparison of a current performance measure against a threshold) used in triggering the defragmentation function, may also be stored on the peripheral device 200 itself Preferably, the defragmentation program is resident on the host device to which the peripheral device 200 is coupled, and the means to initiate 212 is simply a command that passes over the interface of the coupling means 204 that causes the host device to execute, at least on the data storage segment 206, a de-fragmentation program or similar such performance-enhancing program. Alternatively, the performance-enhancing program may be stored on the peripheral device 200 itself. The performance-enhancing program, whether run by a processor 218 of the peripheral device or more universally by a processor of the host device, will then de-fragment or otherwise clean up the various clusters on at least the data file segment 206, and derive a measure of memory available (or equivalently of memory used by user data files) in the peripheral device 200. Since de-fragmentation or other optimizing program was just run on the media, that measure of available memory is an optimized measure.

That measure of memory available is then entered into an actual performance register 214 that is optionally within the peripheral device 200. This is to enhance the portability of the device 200. When the peripheral device 200 is de-fragmented by a first host and the measure of memory available is stored in the actual performance register 214, a second host to which the peripheral device 200 is later coupled can merely read the measure stored on the peripheral device 200 rather than analyze the data file structure of the newly inserted device independently. As noted with respect to FIG. 1, immediately after defragmenting 110, the threshold metric register 210 is updated with the measured performance (register 214) at block 114 of FIG. 1.

Whereas FIG. 2 is directed to a removable peripheral device 200, the same principles described above extend to the invention as embodied on a non-removable peripheral device, such as a solid state drive internal to the host device. A distinction lies in that the coupling means 204 in a non-removable peripheral device is a bus interconnecting the various storage medias with one or more processors/controllers.

In certain instances, it may be advantageous to prevent the peripheral device from being powered down while the performance-enhancing program is running. Whether the program is resident in the host device or the peripheral device, it can prevent a power shutdown itself via software commands and restrictions on competing power-down commands. However, under current technology it is atypical for removable media to carry its own power supply and generally relies on that of the host device. Extracting the peripheral device 200 from the host device during de-fragmentation or other such performance-enhancing programs may cause loss of data or corruption of the program, especially if that program is resident on the peripheral device. To prevent this, the performance enhancing program can merely interrupt further inputs from the user at whatever user interface is available (e.g., electrical busy signal such as a data line low or setting a status register bit) and possibly display an indication of computer activity (e.g., shading a graphical display screen, displaying a "do not interrupt" message) to warn the user not to disconnect either power or the solid state media on which the program is being run (if the media is removable).

Figure 3:
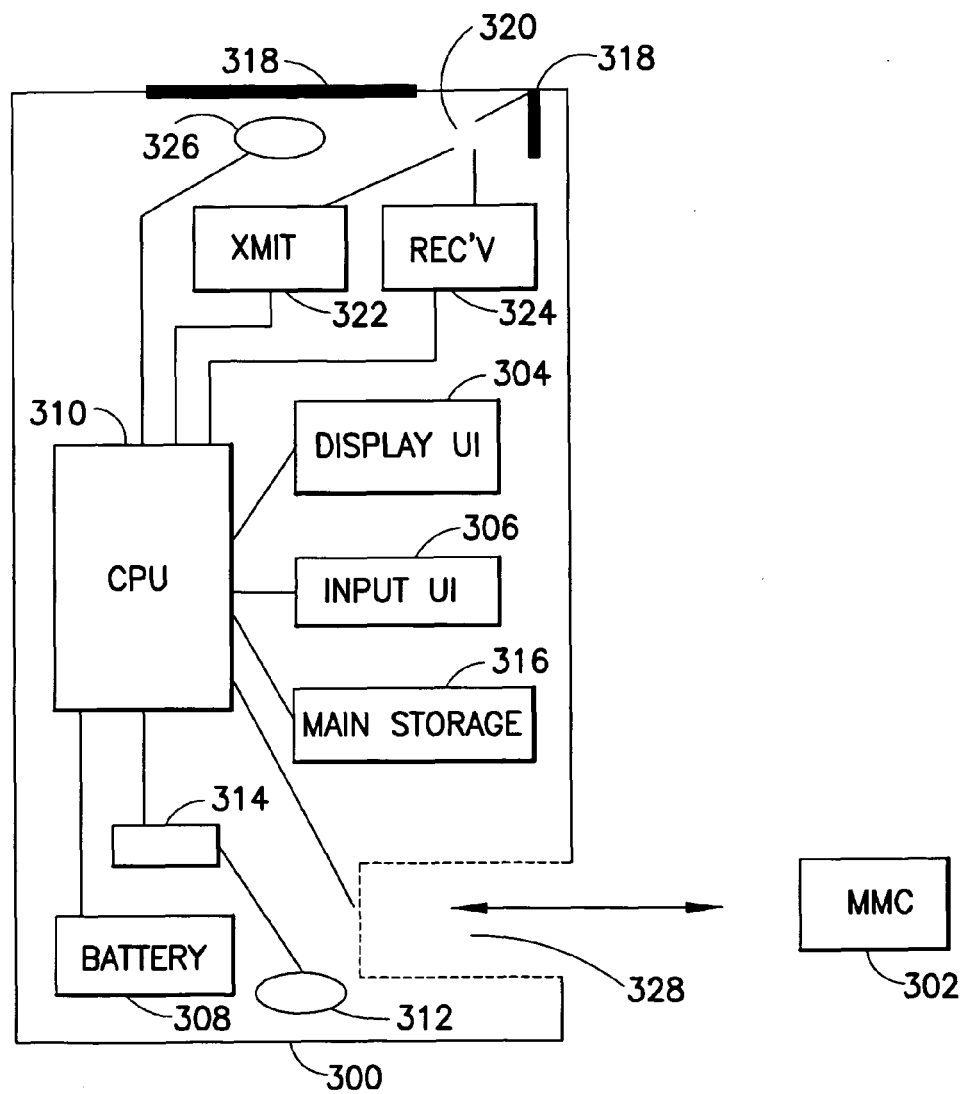
FIG. 3 is a block diagram of a mobile station and a cooperating separate multimedia card according to an embodiment of the present invention.

FIG. 3 illustrates in block diagram a mobile station MS 300 that may be used as a host device for a multimedia card MMC 302 according to the present invention. The multimedia card 302 is similar in function to the removable peripheral device 200 of FIG. 2, and will not be further detailed with respect to FIG. 3. It is irrelevant to the invention whether the removable peripheral device 200, 302 is of a type that extends from an exterior surface of the host device as in FIG. 2, or the type that is inserted within a host device as in FIG. 3.

As to the mobile station 300, the blocks are functional and the functions described below may or may not be performed by a single physical entity as described with reference to FIG. 3. A display user interface 304, such as a circuit board for driving a visual display screen, and an input user interface 306, such as a unit for receiving inputs from an array of user actuated buttons or a touch-sensitive screen, are provided for interfacing with a user. The MS 300 further includes a power source 308 such as a self-contained battery that provides electrical power to a central processor 310 that controls functions within the MS 300. Within the processor 300 are functions such as digital sampling, decimation, interpolation, encoding and decoding, modulating and demodulating, encrypting and decrypting, spreading and despreading (for a CDMA compatible MS 300), and additional signal processing functions known in the art.

Voice or other aural inputs are received at a microphone 312 that may be coupled to the processor 310 through a buffer memory 314. Computer programs such as drivers for the display 304, algorithms to modulate, encode and decode, data arrays such as look-up tables, and in certain embodiments the de-fragmentation program detailed above (when run from host device rather than stored on and run from the MMC 302) and others are stored in a main memory storage media 316 which may be an electronic, optical, or magnetic memory storage media as is known in the art for storing computer readable instructions and programs and data. The main memory 316 is typically partitioned into volatile and non-volatile portions, and is commonly dispersed among different storage units, some of which may be removable. The MS 300 communicates over a network link such as a mobile telephony link via one or more antennas 318 (internal antennas shown) that may be selectively coupled via a T/R switch 320, or a dipole filter, to a transmitter 322 and a receiver 324. The MS 300 may additionally have secondary transmitters and receivers for communicating over additional networks, such as a WLAN, WIFI, Bluetooth®, or to receive digital video broadcasts. Audible output from the MS 300 is transduced at a speaker 326.

A port 328 is configured to receive a MMC 302. As illustrated, the port 328 is within a cavity of the host mobile station 300, though it may be an electrical receptacle disposed along an exterior surface of the host device (as with a desktop or laptop computer to which the removable media 200 of FIG. 2 would couple). The port 328 is a means by which the portable removable media 302 couples electrically (or magnetically or optically) with the host device 300. The port 328 is coupled to the processor 310 such that a MMC 302 properly coupled to the port 328 is coupled to the processor, typically by a series of mating slide contacts or in other types of removable media by mating pins and holes. Optical or magnetic coupling means may also be used, though those are currently not in common use. In this manner, a performance-enhancing program resident on the main memory 316 of the host device 300 can execute on a storage segment of the removable MMC 302, and can be initiated by a command originating in that same removable MMC 302. While a mobile station 300 is particularly described, any host device may similarly operate with the MMC 302.

When the MMC is plugged into the host device, the host device reads it and lists it (internally) as another storage location. Where a personal computer is the host, this is typically manifest in the computer listing the removable media as a separate drive, indistinguishable from other internal drives except for a letter designation. But the host device will not know that the removable media also carries the above-described command instruction, performance metric, or register to which the host device is expected to write. The host device therefore is also equipped with a driver according to the present invention.

The driver is a set of computer software code that instructs the host device how to read the portable peripheral device. In this instance, the driver becomes active upon the peripheral device being electrically (or magnetically or optically) coupled to the host device. The driver can be a part of the host device operating system (e.g., programmed at the device manufacturer), it may be uploaded to the host device from the removable peripheral device itself, or may be downloaded to the host device from another source (e.g., downloading a particular software program or an update to the host device operating system). In the case of the mobile station being the host device, the driver may be downloaded wirelessly over a wireless cellular network. The driver allows software on the removable peripheral device, such as the command to initiate a de-fragmentation program, to be recognized in the host device. The driver may also instruct the host device to write the current performance measure to the register in the peripheral device.

The above description of FIG. 3 presumes that the peripheral device is removable, though this is not a limitation to the invention. As noted with respect to FIG. 2, the peripheral device may be removable or non-removable, with minor variations between the different implementations as noted with reference to FIG. 2. The main storage 316 may be divided into volatile and non-volatile portions, of which the present invention may be used to scan and optimize the non-volatile portion of the main memory or a logical subset of that non-volatile portion.

Although described in the context of particular embodiments, it will be apparent to those skilled in the art that a number of modifications and various changes to these teachings may occur. Thus, while the invention has been particularly shown and described with respect to certain detailed embodiments, it will be understood by those skilled in the art that certain modifications or changes may be made therein without departing from the scope and spirit of the invention as set forth above, or from the scope of the ensuing claims.

What is claimed is:

1. A method comprising:
   connecting a host device to a peripheral device that comprises a solid state data storage segment; and
   initiating in the peripheral device defragmentation function, and executing the defragmentation function on the data storage segment, wherein the solid state data storage segment comprises a register storing, upon receipt from the host device, block validity and sequences for data that are used to initiate the defragmentation function.

2. The method of claim 1 wherein executing the defragmentation function is by a command from the host device, and a processor in the peripheral device accesses a physical layer of the data storage system when executing the defragmentation function.

3. The method of claim 1 wherein connecting the host device to the peripheral device comprises enabling the host device direct access to a physical/logical address table associating physical storage locations with stored data, said physical/logical address table stored in the peripheral device.

4. The method of claim 1, wherein the defragmentation function is executed automatically based on the comparison.

5. The method of claim 1, wherein executing the defragmentation function comprises caching within the peripheral device.

6. The method of claim 1, wherein the peripheral device is normally removable from the host device.

7. The method of claim 1, wherein the defragmentation function is initiated when block validity parameters of the data storage segment fall below a threshold value.

8. An apparatus comprising:
   a solid state data storage segment configured to store data identified by corresponding file names;
   the solid state data storage segment configured to store an association table of physical addresses to logical addresses of the data;
   an interface configured to connect the apparatus to a host device, said interface enabling said host device to access the data storage segment; and
   at least one processor configured to initiate a defragmentation function on the data when connected to the host device, wherein the defragmentation function is initiated by a register storing, upon receipt from the host device, block validity and sequences for the data.

9. The apparatus of claim 7, wherein the defragmentation function is executed in response to a command from the host device over the interface, the apparatus further comprising a processor configured to access a physical layer of the data storage system when the defragmentation function is executing.

10. The apparatus of claim 8, comprising the interface is configured to enable direct access by the host device to the physical addresses of at least one of the table and the file names.

11. The apparatus of claim 8, wherein the defragmentation function is executed automatically based on the comparison.

12. The apparatus of claim 11, further comprising a cache register configured to cache data operated on by the defragmentation function, and a processor configured to cache the data while executing the defragmentation function.

13. A memory embodying a program of machine-readable instructions, the program of machine-readable instructions executable by a digital data processor, to perform actions directed toward managing a solid state storage media, the actions comprising:
   determining that a peripheral device is coupled to a host device;
   at the peripheral device, initiating a defragmentation function; and
   executing the defragmentation function on a solid state data storage segment of the peripheral device, wherein initiating the defragmentation function comprises examining a register in the peripheral device in which is stored block validity and sequences, received from the host device, of data that are stored in the solid state data storage segment.

14. The memory of claim 13, wherein executing the defragmentation function is by a command from the host device and comprises accessing a physical layer of the solid state data storage segment by a processor of the peripheral device.

15. The memory of claim 13, wherein the host device is enabled direct access to a physical/logical address table associating physical storage locations with stored data, said physical/logical address table stored in the peripheral device.

16. The memory of claim 13, wherein the peripheral device comprises a first register storing a threshold performance metric of the data storage segment and a second register storing a current performance value of the data storage segment, and wherein initiating the defragmentation function comprises comparing the current performance value against the threshold performance metric.

17. The memory of claim 16, wherein the defragmentation function is executed automatically based on the comparison.

18. The memory of claim 13, wherein executing the defragmentation function comprises caching within the peripheral device.

19. The memory of claim 13, wherein the peripheral device is normally removable from the host device.

20. The memory of claim 13, wherein initiating the defragmentation function comprises block validity parameters of the data storage segment falling below a threshold value.

21. The apparatus of claim 8 embodied in a peripheral device.

* * * * *